No. 622,215.   E. C. FRAZEE.   Patented Apr. 4, 1899.
PRUNE DIPPER.
(Application filed May 2, 1898.)

(No Model.)

Witnesses,

Inventor,
Edwin C. Frazee,
By Dewey Strong & Co
Attys

THE NORRIS PETERS CO., PHOTO-LITHO., WASHINGTON, D. C.

UNITED STATES PATENT OFFICE.

EDWIN C. FRAZEE, OF SANTA ROSA, CALIFORNIA, ASSIGNOR TO HENRY DE WITT FRAZEE, OF SAME PLACE.

PRUNE-DIPPER.

SPECIFICATION forming part of Letters Patent No. 622,215, dated April 4, 1899.

Application filed May 2, 1898. Serial No. 679,513. (No model.)

*To all whom it may concern:*

Be it known that I, EDWIN C. FRAZEE, a citizen of the United States, residing at Santa Rosa, county of Sonoma, State of California, have invented an Improvement in Prune-Dippers; and I hereby declare the following to be a full, clear, and exact description of the same.

My invention relates to a device which is especially designed for preparing prunes for drying.

It consists, essentially, of a novel construction and mounting of an open-work basket, into which the prunes are first delivered, and mechanism by means of which the basket is submerged in the tank containing the hot caustic solution or in the subsequent washing-tanks, and a means for elevating the device from the tank and retaining it in the elevated position or subsequently discharging it.

It also comprises details of construction, which will be more fully explained by reference to the accompanying drawings, in which—

Figure 1:
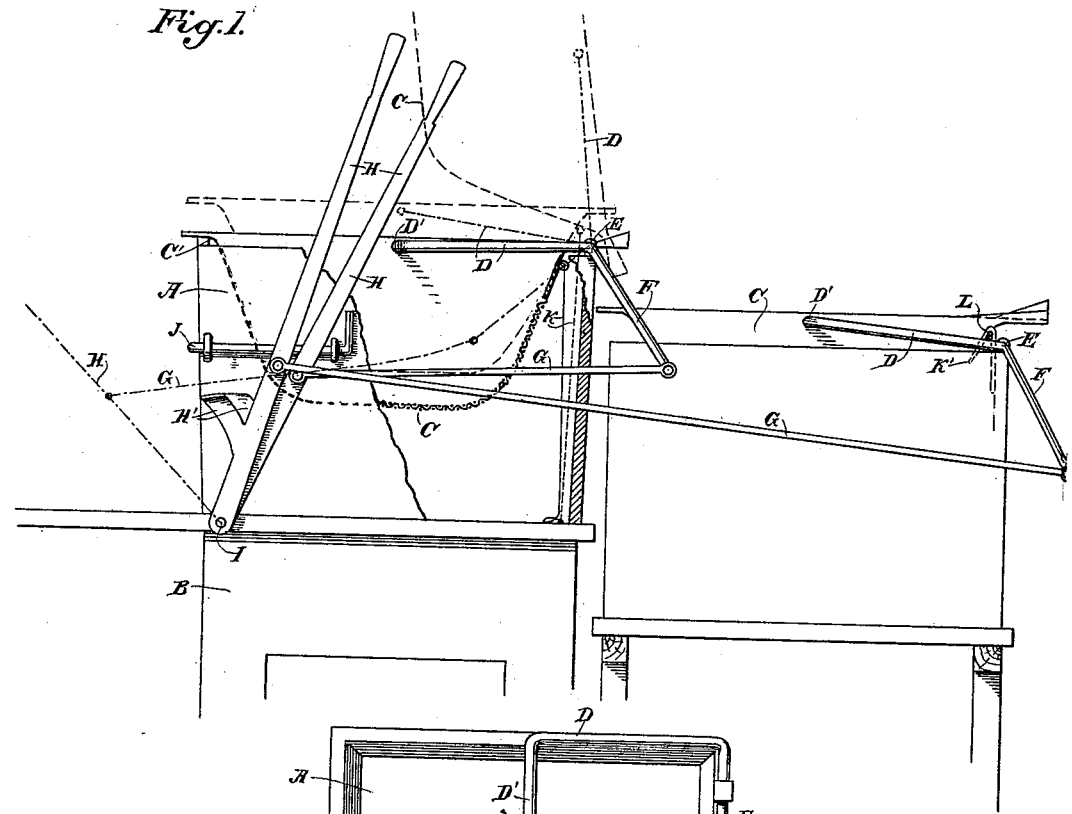
Figure 2:
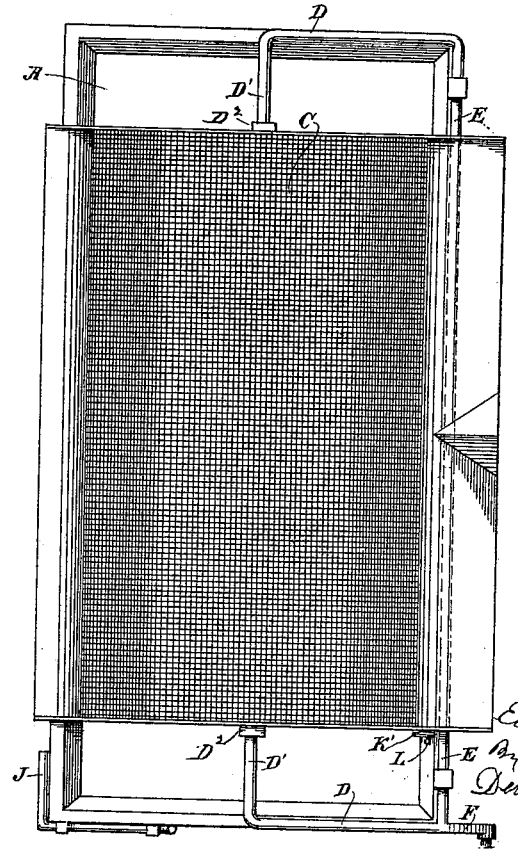

Figure 1 is a side elevation of my device. Fig. 2 is a plan of the same.

The object of my invention is to provide a convenient and rapid method of handling the dipping-baskets, so that they may first be raised out of the solution or washing-tank and the surplus liquid allowed to drip and drain off and then tilted, so as to discharge their contents at the point where the next portion of the operation is to be carried on.

A is the tank, which is made of any suitable size, shape, and material, adapted to contain either a caustic solution, which is employed for cutting the skins of the prunes preparatory to drying, or it may represent the subsequent-washing tank, into which the prunes are plunged for the purpose of cleansing them after the first solution has done its work.

The first tank A is supported over a furnace B, so that the solution may be kept heated to any desired temperature.

The basket C is made of suitable shape and dimensions. In the present case I have shown it made with closed sides and with a bottom formed of wire screen or network of sufficient fineness to retain the prunes. The ends of the basket are in the form of curved plates C', which project sufficiently beyond the body of the basket to rest upon the opposite edges of the tank A, and thus support the basket when it has been lowered into the tank.

In order to move the basket so as to depress it into the tank, raise it out of the tank, and tilt it, so as to discharge the contents, I have shown a mechanism which consists of crank-arms D, projecting from a shaft E, which shaft is journaled upon the edge of the tank adjacent to the discharge edge of the basket. These crank-arms D project along the ends of the tank to a point opposite the center of the basket, where they are bent at right angles extending inwardly, as shown at D', and the inner ends of these arms form journals adapted to engage sockets $D^2$ on the sides of the basket and upon which the center of the sides of the basket is suspended, so that the basket is approximately balanced upon these journals. From one end of the shaft E a crank F extends outside of the tank A, and a pitman G extends from this crank to the lever H. This lever is fulcrumed, as shown at I, and I have here shown it as extending upward, so as to form a hand-lever, and having also a projecting foot-piece H', so that, if preferred, the operator may move it by placing the foot upon the foot-piece.

The operation of the device will then be as follows: The basket may be charged with the fruit to be treated by any suitable means, the fruit being delivered, preferably, over the rear end until the basket is sufficiently filled. The basket when lowered into the tank rests upon the end projections C', as previously described, and when the prunes have been sufficiently acted upon the operator pulling upon the lever H causes it to act, through the pitman G and crank F, to rotate the shaft E. This turns the fulcrum-arms D D' upward, and thus raises the basket bodily out of the liquid. The basket may be held in this position, either temporarily or permanently, long enough to allow a surplus liquid to drip from it before the prunes are discharged. It may be held by hand for a short time, or if it is desired to hold it up for a considerable length of time this may be done by turning the crank-arm J, which is fulcrumed upon the side of the tank, so that it projects in front of the lever H when the latter has been drawn back, and this prevents the basket from again dropping into the tank. When the contents are to be discharged, it is done by continuing the backward movement of the lever H until the front edge of the basket is moved over the front edge of the tank in the direction of the discharge. When it has been advanced sufficiently, it is caught either by a cord K, which connects the front edge of the basket with a fixed point with relation to the tank, which prevents the front edge being lifted any farther, or it may be similarly caught by means of a hook-rod K', fixed to the tank and adapted to engage a rod or lug L, which projects from the front of the basket. The continued backward movement of the lever H after the basket has been lifted from the tank, as previously described, will commence to throw it forward by reason of the movement of the lever-arms D about the fulcrum-shaft E, and this will project the forward discharge-spout of the basket sufficiently over the edge of the tank to insure the proper discharge of the fruit when the basket is tilted. This continued movement then causes the connection K or K' to act upon the front of the basket to prevent its being lifted any farther, and this point then becomes the fulcrum about which the basket moves, the power then being applied, through the arms D D', to tilt the rear portion of the basket about this temporary fulcrum until the basket is sufficiently tilted to cause it to discharge its contents to the next part of the apparatus.

As previously described, there are usually two tanks, one containing hot caustic solution and the next one water for washing the prunes, each tank having a basket, and from the second basket the fruit is discharged upon drying or spreading tables. (Not here shown.)

The two sets of baskets are operated independently, each having its own operating-lever H and pitman G. The levers may be situated close together near the first tank, and it is only necessary to extend the pitman G of the second basket to a sufficient length to connect with its crank F, so that the two may be readily operated.

The discharge-spouts of the basket are upturned at the sides, as shown, and may, if desired, have a central upwardly-projecting V-shaped device which will serve to separate and distribute the fruit as it passes out of the basket.

Having thus described my invention, what I claim as new, and desire to secure by Letters Patent, is—

1. In an apparatus of the character described, the combination of a tank, a basket having closed sides and perforate bottom, adapted to be submerged in said tank, and mechanism for suspending and lifting the basket, consisting of a shaft journaled upon the edge of the tank and arms extending horizontally rearwardly from the shaft said arms having their end portions bent inward at right angles toward the ends of the basket and having their extremities formed with journals adapted to terminate in sockets in the upper edges of the sides of said basket.

2. In an apparatus of the character described, a dipping-tank, a basket adapted to be submerged within said tank having sockets approximately central of the upper edges of the sides, lever-arms having bent portions extending toward the ends of the basket and terminating in and pivotally connecting with the sockets of the baskets and the opposite ends connecting with a shaft journaled along the front edge of the tank, a crank-arm extending from said shaft exterior to the tank, a fulcrumed hand-lever having a foot actuating-piece, means engaging and holding said lever in its moved position, and a pitman connecting said lever with the crank of the tilting shaft, whereby the basket may be raised from or depressed into the tank.

3. In an apparatus of the character described, a dipping-tank, a basket having closed sides and a foraminous bottom and having closed projecting ends adapted to rest upon the front and rear edges of the tank when the basket is submerged, one of said ends having upturned lips and forming a discharge for the basket, sockets formed approximately central of the upper edges of the basket sides, lever-arms having bent portions extending toward the sides of the basket and having end journals upon which said sockets are suspended to swing, a shaft journaled upon the front edge of the tank with which said arms are connected, a crank-arm connection from said shaft exterior to the tank, a fulcrumed hand and foot lever and a pitman connecting said lever with the crank, whereby the basket may be raised from the tank and a checking device whereby the front of the basket is arrested after it has been raised from the tank, said device forming a fulcrum about which the rear portion of the basket is lifted and turned so as to discharge its contents.

4. In an apparatus of the character described, a dipping-tank, a basket having foraminous bottom, closed sides, and the front and rear extended to rest upon the edges of the tank when the basket is submerged, a shaft journaled upon the front of the tank having arms extending rearwardly upon each side of the basket, fulcrum-points approximately central of the upper edges of the sides of the basket whereby the latter is suspended from the terminals of the arms, a crank and actuating-lever connected with the shaft whereby the latter is rotated to raise or depress the basket, a stop having a crank-arm to engage the lever whereby the basket may be retained in its elevated horizontal position, and a tripping device connecting with the front edge of the basket, forming a fulcrum about which the rear portion of the basket is tilted by the continued movement of the suspending-arms so as to discharge its contents.

In witness whereof I have hereunto set my hand.

EDWIN C. FRAZEE.

Witnesses:
H. DE W. FRAZEE,
S. H. NOURSE.